United States Patent [19]

Mihealsick

[11] Patent Number: 5,390,440
[45] Date of Patent: Feb. 21, 1995

[54] APPARATUS AND METHOD FOR PROVIDING A MEASURED FLOW OF EXTERMINATING FLUID

[76] Inventor: Patrick M. Mihealsick, 1023 Kismet Dr., Aiken, S.C. 29803

[21] Appl. No.: 144,001

[22] Filed: Nov. 1, 1993

[51] Int. Cl.6 .............................................. A01M 1/24
[52] U.S. Cl. .................................................... 43/124
[58] Field of Search ................................. 43/124, 900

[56] References Cited

U.S. PATENT DOCUMENTS

| | | | |
|---|---|---|---|
| 2,906,056 | 9/1959 | Youngblood | 43/124 |
| 3,124,893 | 3/1964 | Glenn | 43/124 |
| 3,550,542 | 12/1970 | Hollis | 111/95 |
| 3,774,556 | 11/1973 | Poll | 43/124 |
| 4,028,841 | 6/1977 | Lundwall | 43/124 |
| 4,550,676 | 8/1985 | Francis | 116/206 |
| 4,637,161 | 1/1987 | Turner | 43/130 |
| 4,836,415 | 6/1989 | Grussmark | 222/39 |
| 4,872,594 | 10/1989 | Bloom | 222/173 |
| 4,991,755 | 2/1991 | Grussmark | 222/638 |

*Primary Examiner*—Kurt Rowan
*Attorney, Agent, or Firm*—Benoni O. Reynolds

[57] ABSTRACT

An apparatus and a method for eliminating termites, roaches and other insects from homes by injecting the ground with uniform amounts of exterminating fluid. To be effective in eliminating these pests and to meet state environmental regulatory laws, it is important that the right quantity of exterminating fluid be injected. This invention provides a means for electronically recording the time length of an initial injection and by audible tones advise the user when an identical time length has elapsed on subsequent injections. By use of this timing mechanism, the user can be assured that a uniform amount of exterminating fluid has been injected with each use of this exterminating fluid injector.

3 Claims, 6 Drawing Sheets

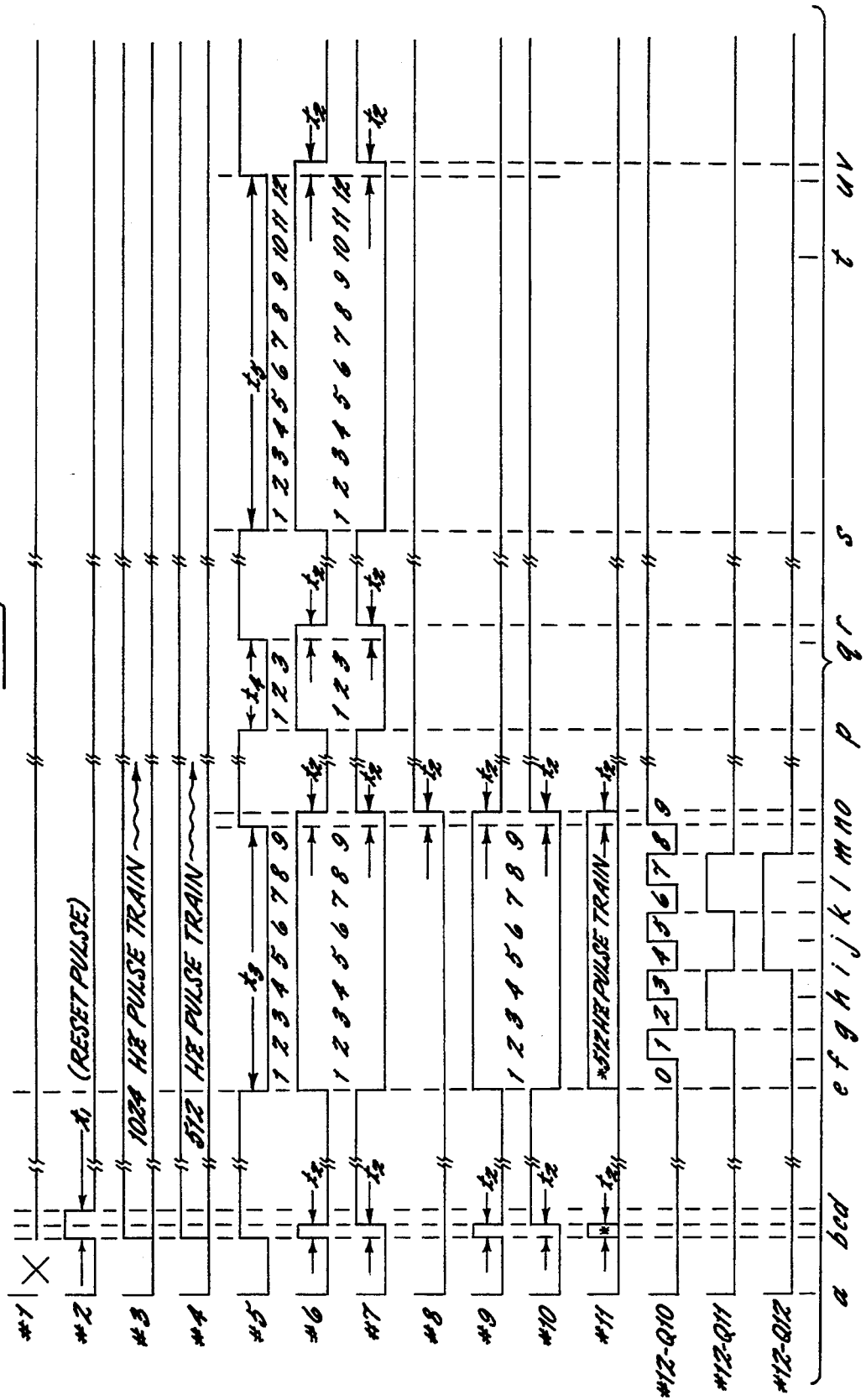

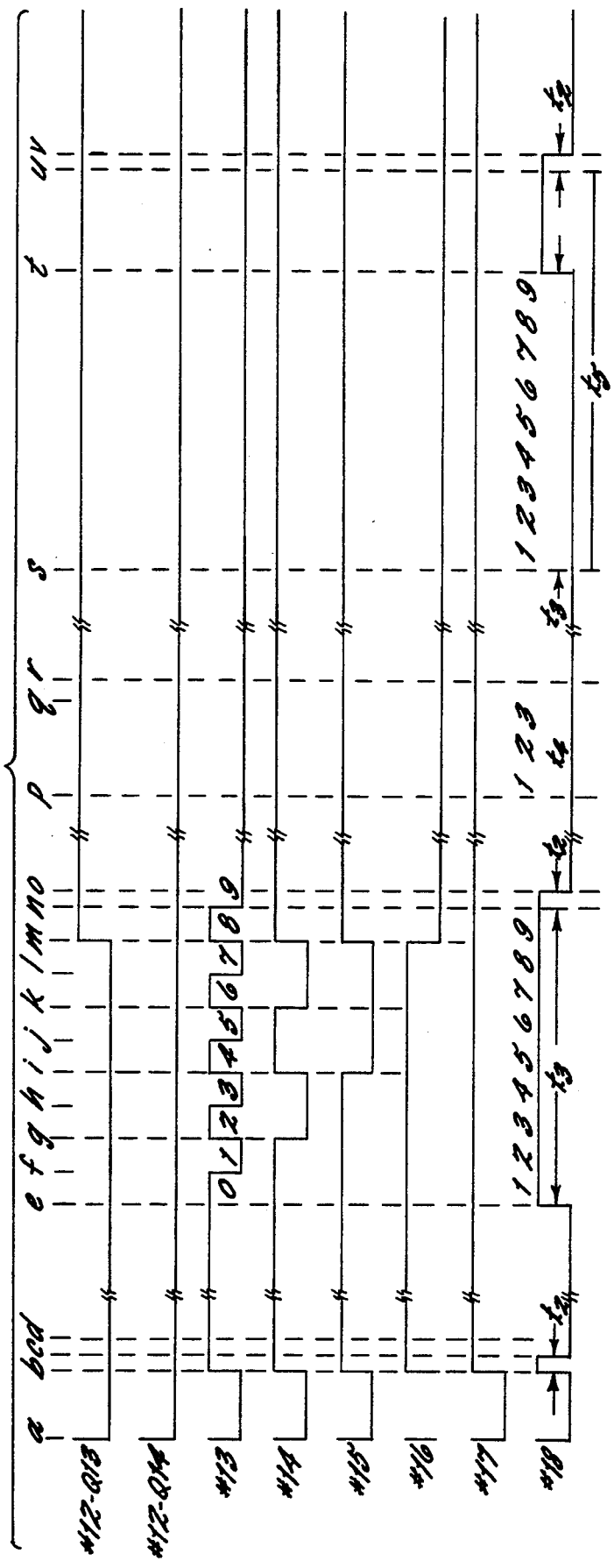

APPARATUS AND METHOD FOR PROVIDING A MEASURED FLOW OF EXTERMINATING FLUID

BACKGROUND OF THE INVENTION

1) Field of Invention

This invention relates to apparatus and a method for injecting exterminating fluid into the ground or through a concrete slab surface for the extermination of termites, roaches and other insects. More particularly it relates to the use of an electronic timing device and audible tones to provide uniform injections of exterminating fluid.

2) Description of Prior Art

Environmental and economic considerations have increased the interest in more effective control of pesticides used in the extermination of termites, roaches and other types of objectionable insects. This concern has resulted in more stringent government regulation of the use of insecticides and a sincere desire on the part of exterminators to render more effective service. Chlordane has been outlawed. New alternative exterminating fluids are expensive as well as hazardous, it is desirable to identify and control the exact quantity of exterminating fluid being used to combat a particular type of insect infestation. The present invention provides a new and more efficient apparatus and method for timing the initial injection of exterminating fluid, automatically memorizing the time interval of the initial injection and duplicating the same dose of exterminating fluid on each subsequent injection.

The control of the flow of exterminating fluids has been a continuing problem. Fluid must not be wasted, yet enough dosage must be provided to do the job at hand. The amount of exterminating fluid required varies with the type of insect involved and with the environmental circumstance in which the infestation has occurred.

In the prior art, control of the amount of fluid injected was not a primary consideration and the emphasis was on mechanical approaches and independent timing mechanisms. In 1970, Hollis (U.S. Pat. No. 3,550,542) introduced an applicator having a hollow cylindrical body serving as a reservoir for a quantity of poisoned grain. A rotating cam was used to force the grain out of the discharge opening at the bottom of the shaft into the burrow or raceway of the pest. Quantity was controlled only through the amount of grain placed in the shaft for each injection.

In 1985, Francis (U.S. Pat. No. 4,550,676) introduced a timing device using the visual observance of the sublimation of a volatile core substance. The chosen substance was known to volatilize over a predetermined period and was held in a transparent enclosure means. The claims relate mostly to the volatile substance used for the timing and are not directly related to the exterminating field. In 1987, Turner (U.S. Pat. No. 4,637,161) introduced a tubular ground probe for downward penetration into the habitat of insects or animals. Steam under pressure was forced through a tube and shield attached to the lower portion of a probe. The configuration directed the steam into the ground, thus saturating the adjacent ground area with high temperature steam. No special timing means was provided.

In 1989, Grussmark (U.S. Pat. No. 4,836,415) patented a dental timer. The device was really a toothpaste dispenser with three ways of indicating the time period during which the teeth were being brushed. An hourglass and electrical signaling devices were alternative means for showing the user when two or three minutes had elapsed.

Likewise in 1989, Bloom (U.S. Pat. No. 4,872,594) applied a timing mechanism to a hair color applicator. The applicator was a plastic bottle with a pointed spout. The timer was encased in the base of the applicator and produced a signal, or used a pointer to point to indicia, upon the expiration of a preset time period.

In 1991, Grussmark (U.S. Pat. No. 4,991,755) disclosed a more sophisticated toothpaste dispenser with a timer in the interior of the dispenser. It can be activated by depressing the cap to dispense toothpaste. The timer appears to be mechanical and gives a signal when the time has elapsed for brushing ones teeth.

As can be seen, prior art methods and apparatus have been addressed to the injectors themselves and no electronic or automatic type electrical timers were found which addressed the problem of uniform injections of exterminating fluid. Common solutions in the industry have been stop watches, flow meters and merely counting. Stop watches require two hands and are hard to read under adverse lighting conditions. Flow meters tend to be inaccurate and get clogged. Counting is inaccurate.

The electronic components of the present invention are off-the-shelf and well known in the timer industry. Thus, no attempt was made to search or claim the known functions of the components individually. The uniqueness of the present invention lies in the application of such components and techniques to the improvement of the insect exterminating process.

Prior art known to this inventor includes the following U.S. Pat. Nos.:

| U.S. Pat. Nos. | | |
| --- | --- | --- |
| 3,550,542 | 12/1970 | Hollis |
| 4,550,676 | 11/1985 | Francis |
| 4,637,161 | 1/1987 | Turner |
| 4,836,415 | 6/1989 | Grussmark |
| 4,872,594 | 10/1989 | Bloom |
| 4,991,755 | 2/1991 | Grussmark |

BRIEF SUMMARY OF THE INVENTION

The present invention is an apparatus and a method for improving the quality and cost effectiveness of the extermination of termites, roaches and other insects from homes. It provides a unique means for identifying and memorizing the time interval of the initial injection of exterminating fluid into the ground or slab surface and automatically alerting the exterminator when the time interval of each subsequent injection corresponds to the time interval of the initial injection. By the use of this apparatus and method, the user can be sure that uniform amounts of exterminating fluid are being injected into the infested areas and that government regulations are being fully met.

According to the preferred embodiment of this invention, the apparatus method has
- probe means for injecting exterminating fluids into the ground and through concrete slab surfaces infested with insects,
- control means, attached to probe means, for actuating or discontinuing the flow of the exterminating fluid,
- timing means, connected to control means, for identifying and memorizing the length of time it takes to inject a specific volume of exterminating fluid on the first injection and for identifying the length of time it takes to inject the s&me volume of exterminating fluid on each subsequent injection, a supply pump for bringing a continuous flow of exterminating fluid under pressure to the apparatus.

Probe means is a mounting yoke having a fluid cheer, an off/on fluid valve, a front opening and a bottom opening, a cross member affixed as a T-shaped handle to the top of the mounting yoke, an elongated hollow shaft affixed to the bottom opening of the mounting yoke.

Control means is a spring loaded valve lever, attached to the off/on fluid valve and cantilevered to the side of the mounting yoke, in proximity to the underside of the cross member, a magnetic switch, having two components, the first component being a normally open magnetic switch which is attached to the underside of the cross member and the second component being a magnet which is attached to the topside of the valve lever, electronic wiring, attached to the magnetic switch and terminating in a bayonet type plug, for conducting current from control means to timing means.

Timing means is a timer housing, within which to mount timing circuits, a source of electrical current, a power switch to apply or remove power to the device, a buzzer circuit, to make audible tones when electrical current is applied to the buzzer circuit, a 14 stage ripple-carry binary counter, to count and store in binary memory form, the time interval (setpoint time delay) in seconds for which the magnetic switch is closed (valve lever opened) and for one half second after the magnetic switch is reopened (valve lever released), a D-flipflop circuit, a D-flipflop clock input, a programmable digital delay timer, electronically connected to the magnetic switch, for emitting a one half second pulse to the buzzer circuit, when power is first applied to timing means, thus causing an audible tone to occur, for actuating the buzzer circuit during the time the magnetic switch is closed during the first injection of exterminating fluid, for actuating the buzzer circuit after the memorized length of time has elapsed (setpoint time delay) during the second and subsequent closings of the magnetic switch, a pulse train generator, to generate a 1024 hz pulse train that is fed into the D-flipflop clock input which divides the pulse train into a 512 hz. signal, used by the counter of the binary counter when it is desired to record the setpoint time delay, and into the clock input of the programmable digital delay timer, an inverting debouncing circuit, with a one half second delay at output on opening of the magnetic switch, to sense the closed position of the magnetic switch and to turn the output of the debouncing circuit high at that time, a power-up reset circuit, electronically connected to the D-flipflop circuit and to the binary counter, to initiate a one second pulse to the D-flipflop circuit and to the binary counter, when power is first supplied to one or more circuits of timer means, The preferred embodiment of the method of the present invention for identifying and controlling the flow of exterminating fluid through the apparatus of the present invention has the following steps:

(1) applying power to a programmable digital delay timer by turning the power switch to the "on" position.

(2) on power up, the digital delay timer emits a ½ second pulse to a buzzer circuit which in turn emits an audible tone, (3) on power up, a reset circuit, initiates a one second reset pulse to a D-flipflop circuit and a binary counter, (4) momentarily closing a magnetic switch and compressing a valve lever to open a fluid on/off valve for the initial injection of exterminating fluid, thereby programming a setpoint time delay into the digital delay timer equal to the time interval of the initial injection of exterminating fluid, (5) a continuous audible tone is emitted by the buzzer circuit during the initial injection of exterminating fluid, (6) each subsequent injection of exterminating fluid, by compressing the valve lever against a cross member and closing the magnetic switch, triggers the internal counter of the digital delay timer;

(7) when the internal counter meets or exceeds the programmed setpoint time delay, during each subsequent injection, the output of the digital delay timer turns high, causing the buzzer circuit to emit an audible tone, (8) when the valve lever is released and the magnetic switch is opened, said audible tone ceases, (9) if the valve lever is released before the programmed setpoint time delay, the internal counter of the digital delay timer automatically resets to zero.

OBJECTIVES OF THE INVENTION

The objectives of the present invention are to provide improved extermination of termites, roaches and other insects through an apparatus and method which will:

1) identify the time interval taken (setpoint time delay) and thus the dosage of exterminating fluid placed in the ground or through a concrete slab surface on the first injection;

2) memorize or record that setpoint time delay to be used in controlling the dosage of each subsequent injection of exterminating fluid;

3) permit the duplication of the dosage of exterminating fluid injected (setpoint time delay) during the first injection by identifying that setpoint to the user when he or she performs each subsequent injection of exterminating fluid;

4) provide an audible tone automatically to identify to the user the application of power to the timing means, the length of time of the first injection of exterminating fluid (setpoint) and the termination of that same length of time during each subsequent injection of exterminating fluid;

5) provide an efficient injection technique to maximize the usefulness and cost effectiveness of the exterminating fluid being used under a wide variety of environmental conditions which fully meet governmental regulations.

Other objectives and advantages of the present invention will be apparent during the course of the following detailed description.

BRIEF DESCRIPTION OF THE DRAWINGS

FIG. 7 A and B shows the wave form diagram which is useful in understanding the operation sequence of the components shown in the FIG. 5 (block diagram).

DETAILED DESCRIPTION OF THE PREFERRED EMBODIMENT

Figure 1:
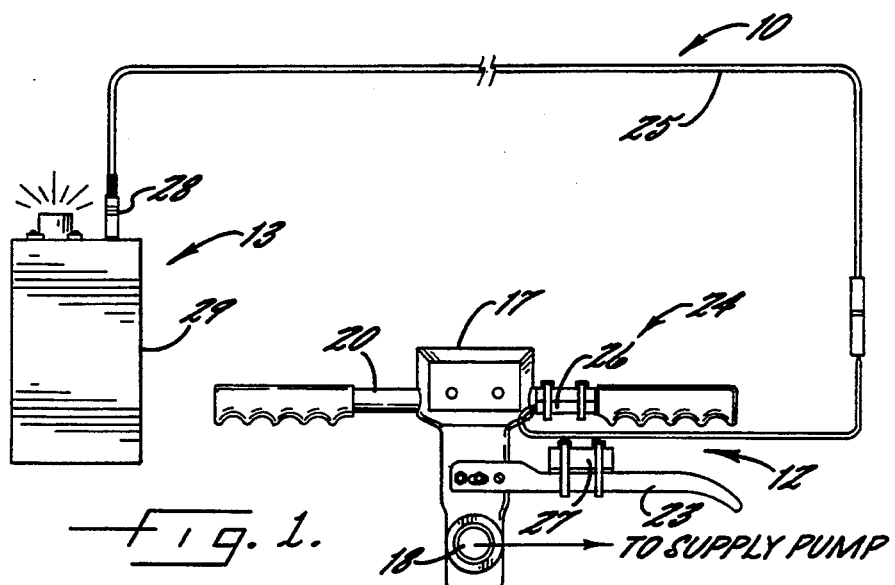
FIG. 1 is a front elevational view of the apparatus of the present invention showing the mounting yoke, cross member, magnetic switch, valve lever and the exterior of timing means.
Figure 2:
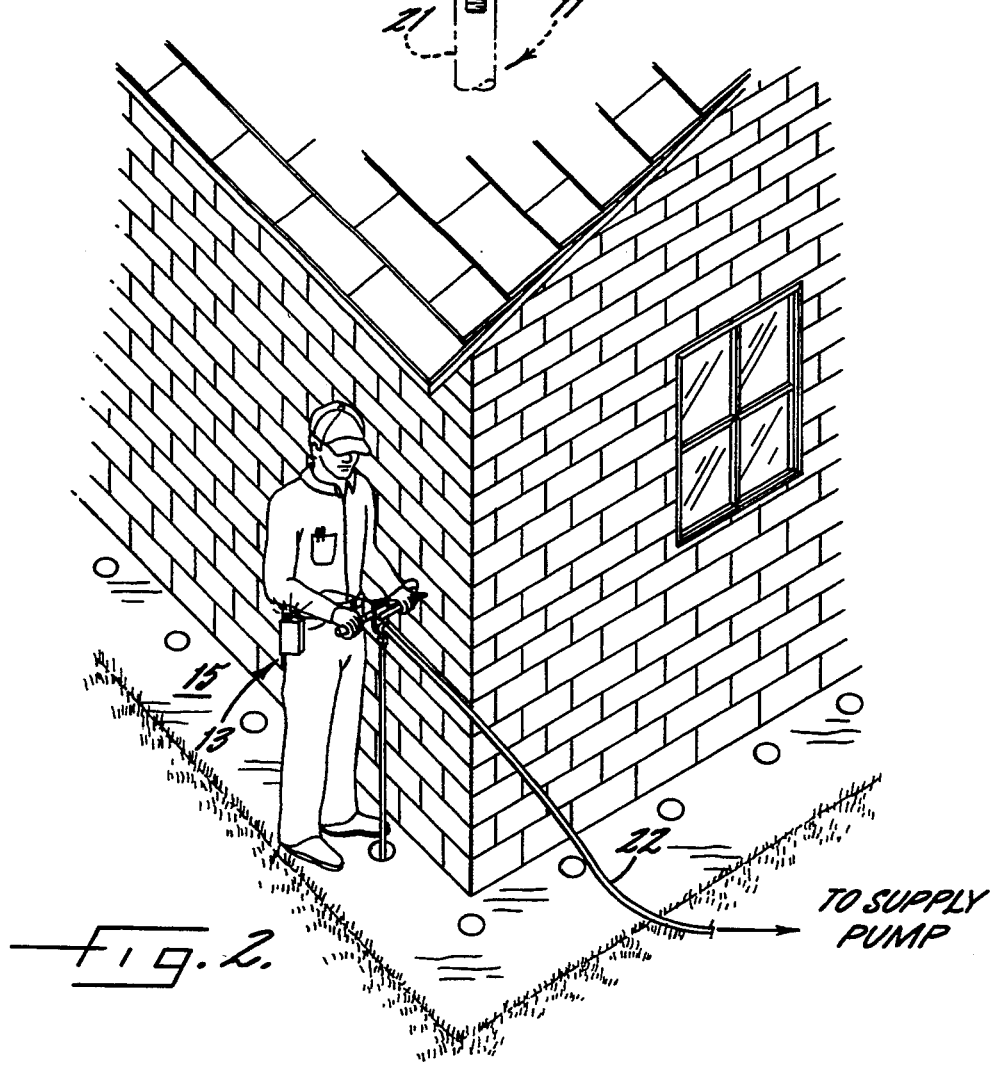
FIG. 2 shows one application of the apparatus and method of the present invention where an exterior perimeter injection of exterminating fluid is in process.
Figure 3:
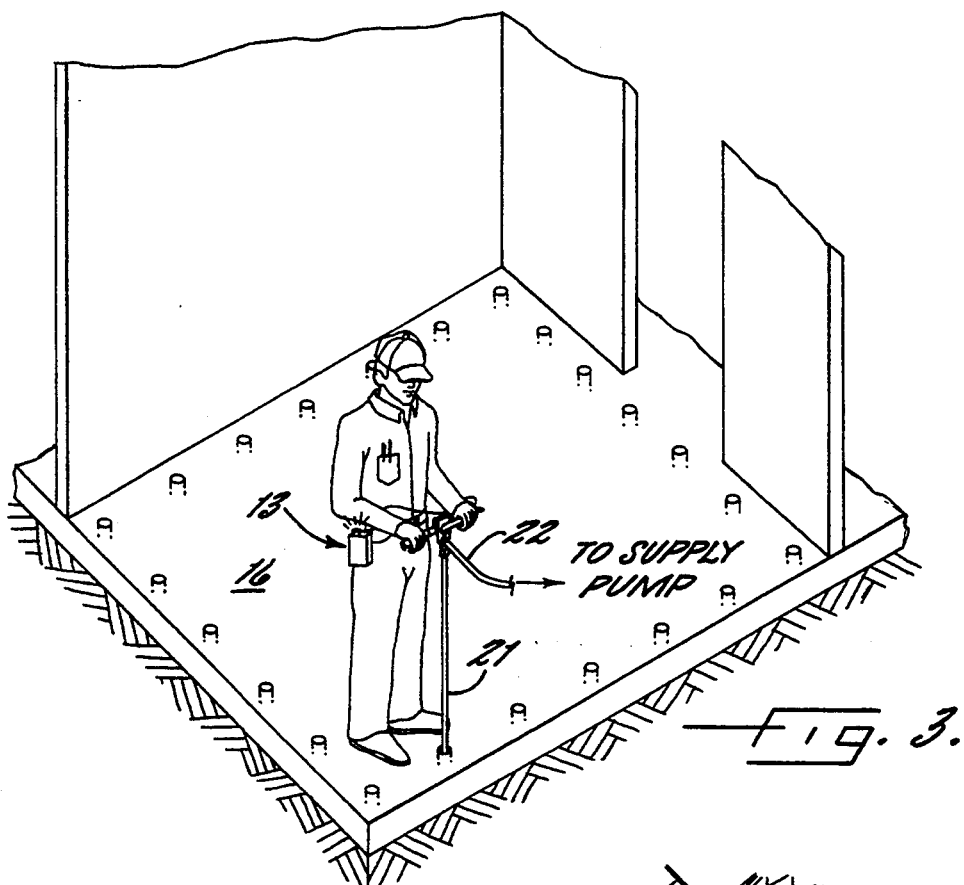
FIG. 3 shows a second application of the apparatus and method of the present invention where an interior injection of exterminating fluid through basement cement flooring or crawl space is in process.
Figure 4:
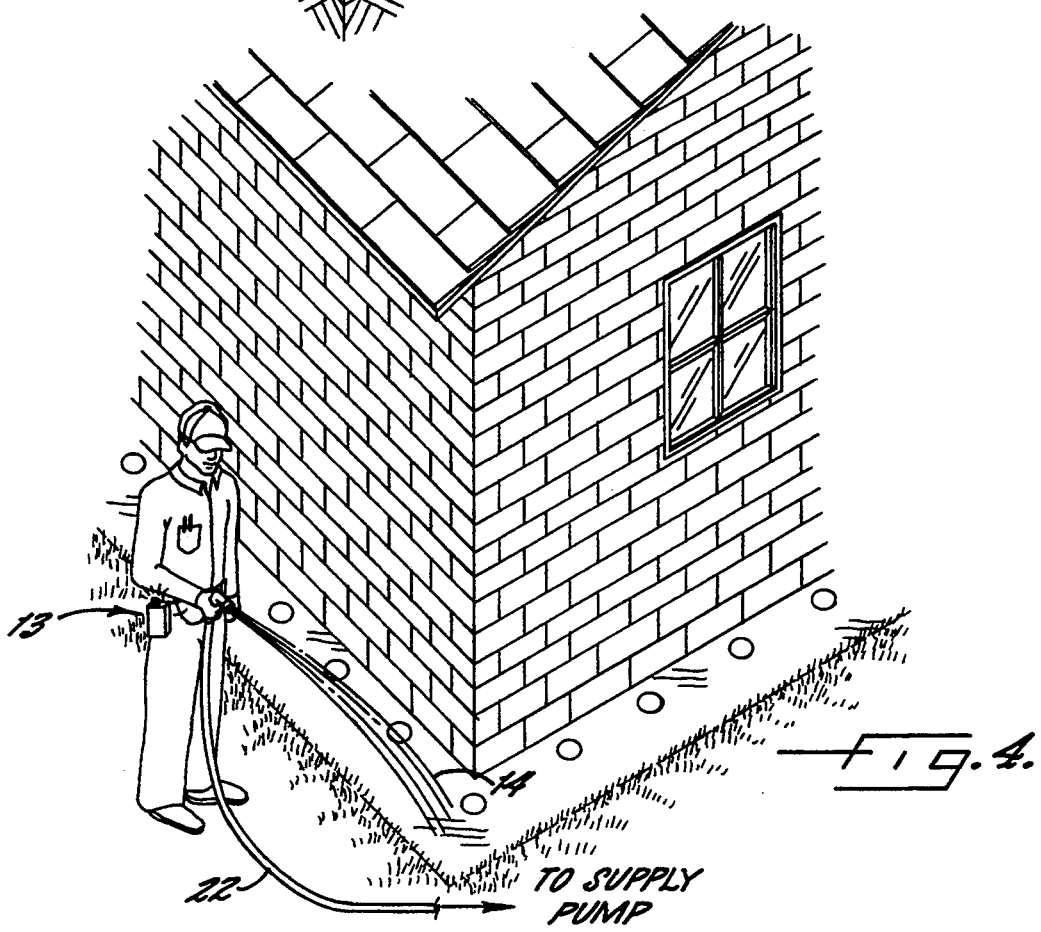
FIG. 4 shows a third application of the method of the present invention for external perimeter spraying of exterminator fluid.

The present invention is an improved apparatus and method for injecting exterminating fluid into the ground or through a concrete slab surface to kill termites, roaches or other insects which infest homes or other buildings. To be effective in eliminating these pests, it is important that the right amount of fluid be injected. The present invention provides exterminators with a means to effectively and accurately apply this exterminating fluid under a wide variety of environmental conditions.

The apparatus of the present invention, shown generally at numeral 10, has a probe means, shown generally at numeral 11, a control means, shown generally at numeral 12, a timing means, shown generally at numeral 13 and a supply pump (not shown) for bringing a continuous flow of exterminating fluid, under pressure, to the apparatus. Probe means 11 injects exterminating fluid 14 into the ground 15, and into slab surfaces 16, infested with insects. Control means 12, attached to probe means 11, actuates or discontinues the flow of exterminating fluid 14 from the supply pump to apparatus 10. Timing means 13, connected to control means 12, identifies and memorizes the length of time the flow of exterminating fluid 14 takes place on the first or initial injection and identifies the length of time the flow continues on each subsequent injection.

In the present invention, probe means 11 is a mounting yoke 17 having a fluid chamber (not shown), an off/on fluid valve (not shown), a front opening 18 and a bottom opening 19, a cross member 20, affixed as a t-shaped handle to the top of mounting yoke 17, an elongated hollow shaft 21, affixed to bottom opening 19 of mounting yoke 17.

The hose 22 from the supply pump is attached to mounting yoke 17 at front opening 18.

Control means 12 of the present invention is a spring loaded valve lever 23, a normally open magnetic switch, shown generally at numeral 24, and electronic wiring 25. Spring loaded lever 23 is attached to the off/on fluid valve of mounting yoke 17 and is cantilevered to the underside of cross member 20, in proximity to the underside of cross member 20. Magnetic switch 24 consists of two components. The first component is a normally opened magnetic switch 26 which is attached to the underside of cross member 20 and the second component is a magnet 27 which is attached to the topside of valve lever 23. Electronic wiring 25, attached to magnetic switch 24 and terminating in a bayonet type plug 28, conducts current from control means 12 to timing means 13.

Figure 5:
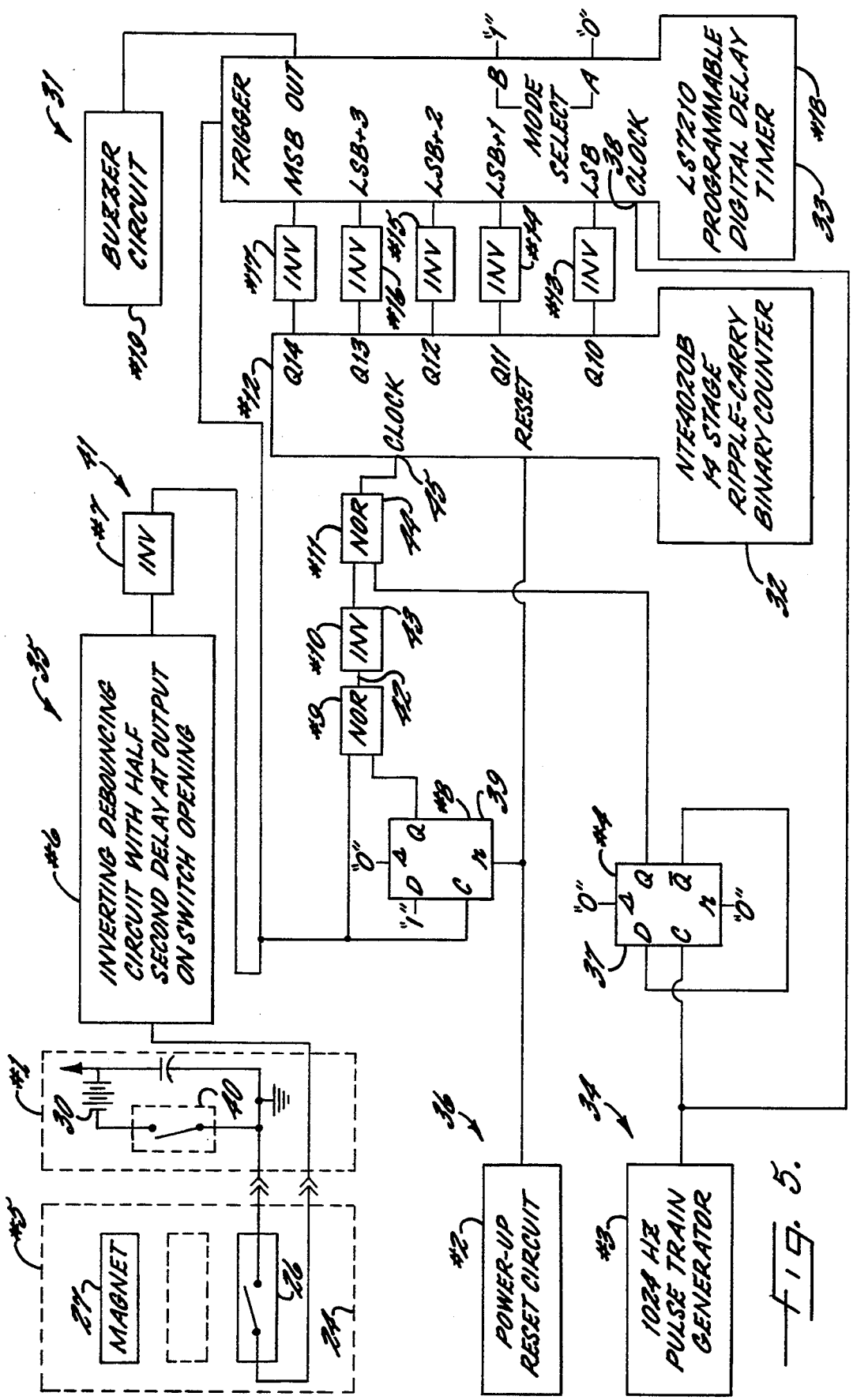
FIG. 5 is a block diagram which shows the interconnection of the magnetic switch of control means of the present invention and of the various electronic components of timing means of the present invention.
Figure 6:
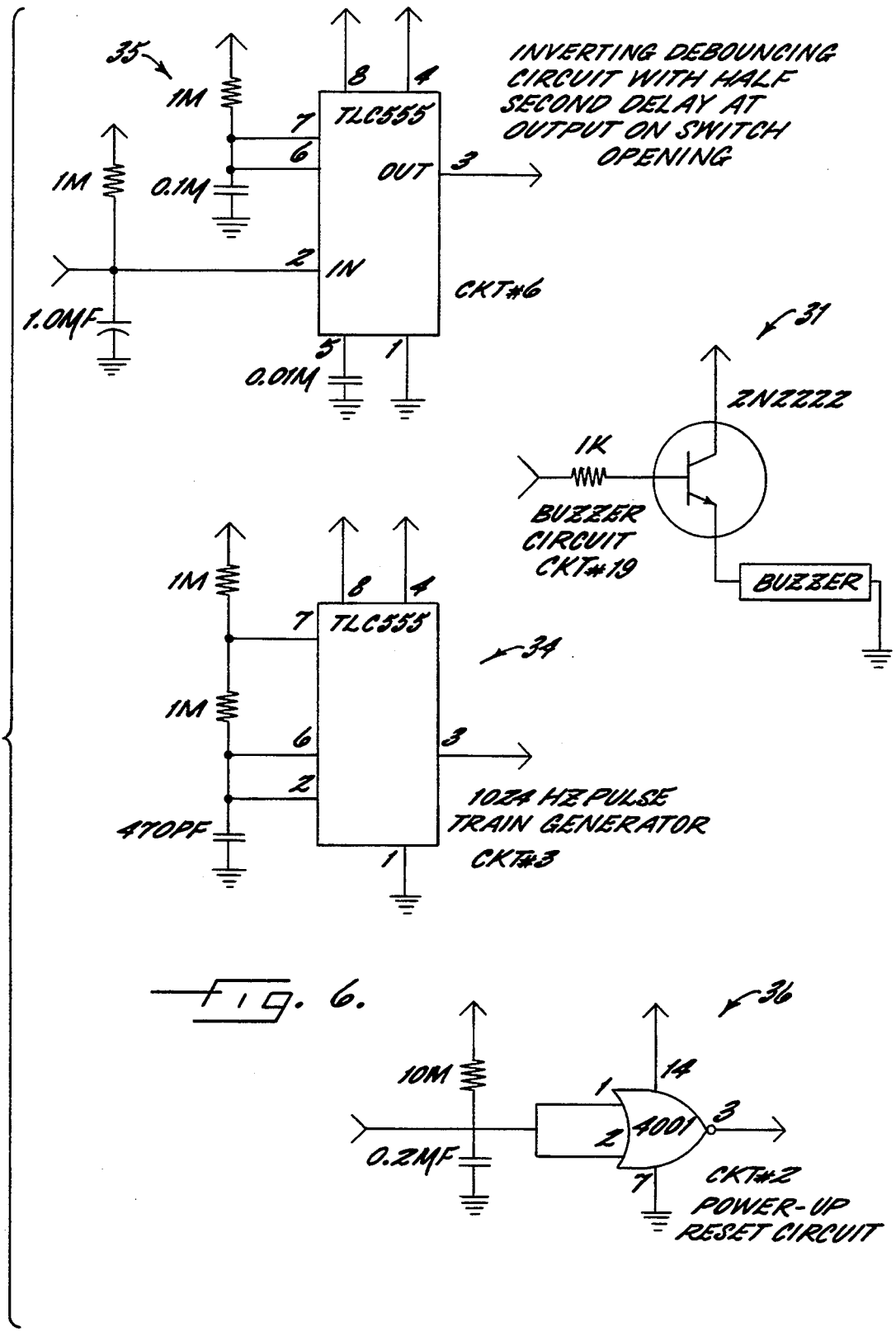
FIG. 6 shows the detail of the inverter debouncing circuit, the buzzer circuit, the 1024 hz. pulse train generator and the power up reset circuit. The circuit numbers correspond to the circuit designations of FIG. 5 (block diagram).

As shown in FIGS. 1, 5 and 6, timing means 13 of the present invention is a timer housing 29, a source of electric current, a battery 30, a power switch 40 to turn timer means 13 on or off, a buzzer circuit, shown generally at numeral 31, a binary counter 32, a programmable digital delay timer 33, a pulse train generator, shown generally at numeral 34, an inverting debouncing circuit, shown generally at numeral 35, a power-up reset circuit, shown generally at numeral 36, and two D-flip-flop circuits 37 and 39.

The timing circuits enumerated above are mounted in timer housing 29. Source of current 30 is provided by direct current, preferably from a 9 volt battery as it is compact and fits easily in the bottom of timer housing 29. Power switch 40 controls the application of power to the timer circuit. Buzzer circuit 31 is shown in FIG. 6 and makes audible tones when electrical current is applied to the circuit.

A 14 stage ripple-carry binary counter 32 counts and stores in binary form the time interval in seconds (setpoint time delay) for which magnetic switch 24 is closed (valve lever 23 opened) and for one half second after magnetic switch 24 is reopened (valve lever 23 released).

Programmable digital delay timer 33 is electronically connected to magnetic switch 24 and emits a one half second pulse to buzzer circuit 31 when power is first applied to timing means 13, thus causing an audible tone to occur. This tone is a good indicator to the operator that timing means 13 is operational. Secondly, delay timer 33 actuates buzzer circuit 31 during the time magnetic switch 24 is closed during the first injection of exterminating fluid, indicating again that the timer circuits are operating. Thirdly, delay timer 33 actuates buzzer circuit 31 after the memorized length of time has elapsed (setpoint time delay) during the second and subsequent closings of magnetic switch 24.

Pulse train generator, shown generally at numeral 34 in FIG. 6, generates a 1024 hz. pulse train that is fed into D-flipflop clock input 37 which divides the pulse train into a 512 hz. signal, used by the counter (not shown) of binary counter 32 when it is desired to record the setpoint time delay and into the clock input 38 of programmable digital delay timer 33.

Inverting debouncing circuit 35, with a one half second delay at output on opening of magnetic switch 24, senses the closed position of magnetic switch 24 and turns the output of debouncing circuit 35 to high at that time.

Power-up reset circuit 36, electronically connected to D-flipflop circuit 39 and to binary counter 32, initiates a one second pulse to d-flipflop circuit 39 and to binary counter 32, when power is first supplied to one or more circuits of timer means 13. D-flipflop circuit 39 and binary counter 32 are the only two circuits that need to be initialized prior to the operation of timer means 13. During this initialization, outputs of the other circuits may be ignored. After initialization, the outputs of these two circuits are low.

The method of the present invention for identifying and controlling the flow of exterminating fluid is
- applying power to a programmable digital delay timer by turning the power switch to the "on" position,
- on power up, the digital delay timer emits a ½ second pulse to a buzzer circuit which in turn emits an audible tone,
- on power up, a reset circuit, initiates a one second reset pulse to a D-flipflop circuit and a binary counter,
- momentarily closing a magnetic switch and compressing a valve lever to open a fluid on/off valve for the initial injection of exterminating fluid, thereby programming a setpoint time delay into the digital delay timer equal to the time interval of the desired initial injection of exterminating fluid,
- a continuous audible tone is emitted by the buzzer circuit during the initial injection of exterminating fluid,
- each subsequent injection of exterminating fluid, by compressing the valve lever against a cross member and closing the magnetic switch, triggers the internal counter of the digital delay timer;
- when the internal counter meets or exceeds the programmed setpoint time delay, during each subsequent injection, the output of the digital delay timer turns high, causing the buzzer circuit to emit an audible tone,
- when the valve lever is released and the magnetic switch opened, the audible tone ceases,
- if the valve lever is released before the programmed setpoint time delay elapses, the internal counter of the digital delay timer automatically resets to zero.

The operation of the present invention can be best described with reference to the block diagram (FIG. 5) of the electronic components of control means 12 and timing means 13 (FIG. 1). For convenience the circuits of the block diagram have been numbered from #1 to #19 in the sequence action takes place and in correspondence with the wave form charts of FIGS. 7a and 7b.

Circuit #1—represents the source of electric current, battery 30, preferably a 9 volt d.c. battery and power switch 40, for timer means 13.

Circuit #2—on power-up the power-up reset circuit 36 initiates a one second reset pulse to D-flipflop circuit 39 and binary counter 32. These are the only two circuits that need to be initialized prior to the operation of magnetic switch 24 and the actualization of the timer sequences. During this initialization the output from D-flipflop circuit 39 and binary counter 32 will be low.

Circuit #3—when power is applied to timer means 13, pulse train generator 34 generates a 1024 hz. pulse train that feeds into D-flipflop 37 and the clock input 38 of programmable digital delay timer 33.

Circuit #4—D-flipflop clock input 37 divides the 1024 hz. pulse train received from pulse train generator 34 into a 512 hz. signal. This signal is used by the counter (not shown) of binary counter 32 when it is desired to record a setpoint time delay to control the flow of exterminating fluid through apparatus 10.

Circuit #5—The setpoint time delay is set when the operator squeezes valve lever 23 of the apparatus 10. The action of the operator causes the normally open magnetic switch 26 to close when magnet 27 on valve lever 23 comes into proximity to the magnetic switch 26 on cross member 20.

Circuit #6—inverting debouncing circuit 35 with a one half second delay at the output of magnetic switch 26 opening senses the closed position of magnetic switch 24 and turns its output high.

Circuit #7—the output of inverter 41 turns low.

Circuit #8—D-flipflop circuit 39 monitors the output of inverter 41 and power-up reset circuit 36.

Circuit #9—The NOR Gate output 42 of circuit #9 turns high as its inputs from inverter 41 and power-up reset circuit 36 are both low.

Circuit #10—the high output of NOR Gate output 42 causes the output of inverter 43 to be low.

Circuit #11—the low output of inverter 43 feeds into one input of NOR Gate 44.

Circuit #12—with this low input to NOR GATE 44, the 512 hz. pulse train from D-flipflop clock input 37 of circuit #4 is fed into the clock input 45 of binary counter 32. The counter (not shown) of binary counter 32 starts counting and continues to count until one half second after valve lever 23 to apparatus 10 is released. This extra one half second allows the counter of binary counter 32 to round up the setpoint time delay to the nearest second. With valve lever 23 released and the output of inverting debouncing circuit 35 low, the output of inverter 41 goes high. This high clocks a digital "1" into D-flipflop circuit 39 causing its output to remain high throughout the rest of the circuit's operation. This action disables the input to clock input 45 of binary counter 32. Subsequent squeezing of valve lever 23 and magnetic switch 24 will not change the setpoint. The setpoint is thus stored, in binary form, at the outputs of binary counter 32. Outputs Q10 (Least Significant Bit), Q11, Q12, Q13 and Q14 (Most Significant Bit) store the setpoint value in seconds.

Circuits #13—#17—this setpoint (up to 32 seconds) at outputs Q10–Q14 of binary counter 32 is fed into programmable digital delay timer 33 through inverter circuits #13–#17.

Circuit #18—With the setpoint programmed into digital delay timer 33 of circuit #18, subsequent injections of exterminating fluid 14 (closing of magnetic switch 24) will trigger the internal counter (not shown) of digital delay timer 33. When the internal counter meets or exceeds the programmed setpoint time, the output of digital delay timer 33 turns high, causing buzzer circuit 31 to emit an audible tone. When valve lever 23 is released (magnetic switch 24 opened), the tone from buzzer circuit 31 ceases. If valve lever 23 is released before the programmed setpoint time, the internal counter of digital delay timer 33 is reset.

I claim:

1. An apparatus for exterminating termites, roaches and other insects from homes, having a timing means, comprising probe means for injecting exterminating fluids into the ground and through concrete slab surfaces infested with insects, which probe means is a mounting yoke having a fluid chamber, an off/on fluid valve, a front opening and a bottom opening, a cross member affixed as a T-shaped handle to the top of said mounting yoke, an elongated hollow shaft affixed to said bottom opening of said mounting yoke;

control means, attached to said probe means, for actuating or discontinuing the flow of said exterminating fluid, which control means is a spring loaded valve lever, attached to said off/on fluid valve and cantilevered to the side of said mounting yoke, in proximity to the underside of said cross member, a magnetic switch, having two components, the first component being a normally open magnetic switch, which is attached to the underside of said cross member and the second component being a magnet which is attached to the topside of said valve lever, electronic wiring, attached to said magnetic switch and terminating in a bayonet type plug, for conducting current from said control means to said timing means;

timing means, connected to said control means, for identifying and memorizing the length of time it takes to inject a specific volume of exterminating fluid on the first injection and for identifying the length of time it takes to inject the same volume of exterminating fluid on each subsequent injection; and a supply pump for bringing a continuous flow of exterminating fluid under pressure to said apparatus.

2. The apparatus of claim 1, where timing means is a timer housing, within which to mount timing circuits, a source of electrical current, a power switch to apply power to the timer circuit, a buzzer circuit, to make audible tones when electrical current is applied to said buzzer circuit, a 14 stage ripple-carry binary counter, to count and store in binary memory form, the time interval (setpoint time delay) in seconds for which said magnetic switch is closed (valve lever opened) and for one half second after said magnetic switch is reopened (valve lever released), a D-flipflop circuit, a D-flipflop clock input, a programmable digital delay timer, electronically connected to said magnetic switch, for emitting a one half second pulse to said buzzer circuit, when power is first applied to timing means, thus causing an audible tone to occur, for actuating said buzzer circuit during the time said magnetic switch is closed during the first injection of exterminating fluid, for actuating said buzzer circuit after the memorized length of time has elapsed (setpoint time delay) during the second and subsequent closings of said magnetic switch, a pulse train generator, to generate a 1024 hz pulse train that is fed into said D-flipflop clock input which divides said pulse train into a 512 hz. signal, used by the counter of said binary counter when it is desired to record the setpoint time delay, and into the clock input of said programmable digital delay timer, an inverting debouncing circuit, with a one half second delay at output on opening of said magnetic switch, to sense the closed position of said magnetic switch and to turn the output of said debouncing circuit high at that time, a power-up reset circuit, electronically connected to said D-flipflop circuit and to said binary counter, to initiate a one second pulse to said D-flipflop circuit and to said binary counter, when power is first supplied to one or more circuits of said timer means, 3. A method for identifying and controlling the flow of exterminating fluid comprising:

applying power to a programmable digital delay timer by turning the power switch to the "on" position, on power up, said digital delay timer emits a ½ second pulse to a buzzer circuit which in turn emits an audible tone, on power up, a reset circuit, initiates a one second reset pulse to a D-flipflop circuit and a binary counter, momentarily closing a magnetic switch and compressing a valve lever to open a fluid on/off valve for the initial injection of exterminating fluid, thereby programming a setpoint time delay into said digital delay timer equal to the time interval of the desired initial injection of exterminating fluid, a continuous audible tone is emitted by said buzzer circuit during the initial injection of exterminating fluid, each subsequent injection of exterminating fluid, by compressing said valve lever against a cross member and closing said magnetic switch, triggers the internal counter of said digital delay timer;

when said internal counter meets or exceeds said programmed setpoint time delay, during each subsequent injection, the output of said digital delay timer turns high, causing said buzzer circuit to emit an audible tone, when said valve lever is released and said magnetic switch opened, said audible tone ceases, if said valve lever is released before said programmed setpoint time delay elapses, said internal counter of said digital delay timer automatically resets to zero.

* * * * *